July 1, 1952  B. AMES  2,601,850
APPARATUS FOR USE IN COOKING FOOD
Filed July 19, 1946
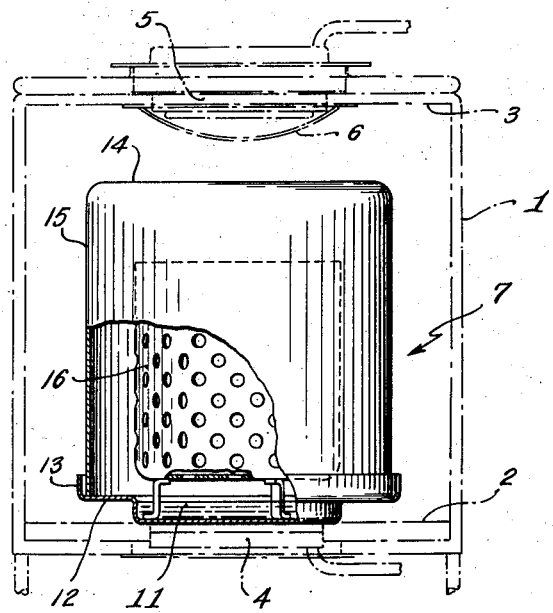
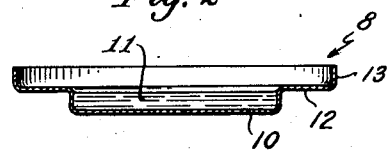
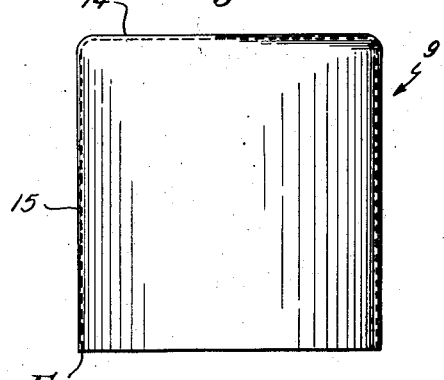
Inventor
Butler Ames
by Att'ys Patented July 1, 1952

2,601,850

UNITED STATES PATENT OFFICE 2,601,850

APPARATUS FOR USE IN COOKING FOOD

Butler Ames, Boston, Mass.

Application July 19, 1946, Serial No. 684,884

1 Claim. (Cl. 126—369)

This invention pertains to apparatus for use in cooking foodstuffs.

The principal object of the present invention is to provide a novel apparatus whereby comestibles, for example vegetables, may be cooked very rapidly and without substantial evolution of odor, and whereby mixed materials, for instance vegetables of different kinds, may be cook in the same container but without substantial intermingling of flavors. Other objects and advantages of the invention will be pointed out in the following more detailed description and by reference to the accompanying drawings wherein Fig. 1 is a front elevation, partly broken away and in vertical section, showing the improved cooking container of the present invention arranged in operative relation to sources of heat energy forming elements of an oven-like structure illustrated in broken lines.

Fig. 2 is a diametrical section illustrating the bottom member of the container, showing a body of water in its lower part;

Fig. 3 is a side elevation of the top member or cover element of the container; and Fig. 4 is a side elevation, partly broken away and in vertical section, of a receptacle for supporting the comestibles during cooking.

Referring to the drawings, the numeral 1 designates an oven structure, preferably having insulating walls with a reflecting interior surface and having the bottom wall 2 and the top wall 3. The bottom wall 2 is provided with a central aperture or chamber in which is arranged a heating unit 4, while the top wall 3 is provided with a central aperture within which is arranged a heating unit 5, protected by a downwardly convex metal grill or grid 6 having its surface coated with a refractory enamel. The units 4 and 5 are supplied with electrical energy from a suitable source, the unit 5 preferably being designed to emit very intenses glowing radiant energy. The heating units 4 and 5 are of the kind disclosed in my Patent 2,508,357, granted May 23, 1950. This oven-like structure may be provided with a suitable door to give access to its interior and may be of any suitable dimensions and structural detail according to the size and external shape of the cooking container which is placed within it. An oven structure comprising the above elements is fully illustrated and described in the copending application for Letters Patent, Serial No. 673,267, filed May 31, 1946, by Butler Ames.

This cooking container, indicated generally by the numeral 7, comprises a shallow base or bottom 8 (Fig. 2) and a deep top or cover member 9 (Fig. 3). The base 8 is made of stainless steel and as here illustrated is circular and comprises the central basin-like depressed portion 10 which is quite shallow and designed to hold a small body of water 11. This base also comprises a horizontal annular flange-like support or seat 12 extending outwardly from the upper edge of the wall of the pan 10, and preferably provided at its outer edge with an upwardly directed cylindrical retaining lip 13. The top or cover 9 is of aluminum and, as here shown, in a more or less dome-shaped shell, being of a diameter slightly less than that of the retaining lip 13 of the bottom member 8 and comprising the top wall 14 and the cylindrical side wall 15, the latter terminating in the lower edge E which is designed to rest upon the annular flange-like support or seat 12 of the bottom member 8. The cover 9 is of substantial depth, as compared with the height of the lip 13 thereby to define a cooking chamber, and is imperforate and completely devoid of any openings through which steam or vapor might escape. The joint, where the lower edge E of the cover rests upon the upper surface of the support 12 constitutes the only outlet through which steam or vapor may escape from within the cooking container. Preferably the upper surface of the support 12 and the lower edge E of the cover are smoothly and accurately finished so that when the parts are assembled the cover must lift slightly from the support in order to permit the escape of steam beneath the lower edge of the cover. With this arrangement the pressure within the cooking chamber is dependent solely upon the weight of the top or cover 9 and is thus substantially uniform and predetermined.

Preferably the container also comprises a receptacle C (Fig. 4) here shown as in the nature of a colander, open at its top and having the perforate cylindrical side wall 16 and bottom wall 17. This receptacle C is provided with legs 18 which are here shown as so arranged that they rest upon the bottom of the basin portion 10 of the part 8.

In using the device, a small quantity of water 11 is first placed in the pan 10, the materials to be cooked are placed in the receptacle C and the latter is then set into the basin 10. The cover 9 is now placed over the container C with its lower edge E resting upon the support 12. The assembled container is now placed in the oven 1, the door of the oven is closed and the heat units 4 and 5 are energized. The energy supplied by the unit 4 is merely sufficient to warm the water 11 in the pan 10 to the point where vapor is evolved, but without necessarily boiling the water. The unit 5 is so energized as to emit intense glowing radiant heat energy, which passes downwardly through the guard 6 and impinges upon the outer surface of the cover 9. As above noted the inner surface of the oven 1 is preferably of a reflecting character, and as the cover 9 is aluminum, the radiant energy is rapidly absorbed and transmitted to the interior of the container where it rapidly raises the temperature of the material in the receptacle 15 to the cooking point. It may be noted that in thus heating the material to be cooked, it is not necessary first to raise a body of water to the boiling point before the food begins to cook nor on the other hand is the food cooked in a dry atmosphere, since the water 11 in the pan 10 furnishes the slight amount of moisture necessary to prevent the material in the receptacle C from browning prematurely. With this arrangement, wherein the heat is applied mainly to the top of the material to be cooked, there is no preliminary condensation of moisture within the container and thus no dripping of moisture from one part of the food to another so that there is no tendency to transfer the flavor of one article of food to another if different substances are being cooked at the same time.

With this arrangement and with an adequate supply of radiant energy delivered from the source 5, it is found that a slight evolution of steam takes place beneath the edge of the cover 9 in about 5 minutes after the source 5 is energized, and that after the first evolution of steam from beneath the cover 9 a further cooking time of 10 minutes is usually amply sufficient thoroughly to cook vegetables of all kinds. It is further observed that vegetables of all kinds appear to cook in substantially the same length of time when cooked in this apparatus. While the cooking of vegetables has been cited as one example of the utility of the invention, it is to be understood that the apparatus is equally applicable to the rapid and effective cooking of any other comestible.

While one desirable embodiment of the invention has herein been illustrated by way of example, it is to be understood that the invention is broadly inclusive of any and all modifications falling within the scope of the appended claim.

I claim:

Cooking apparatus of the kind wherein radiant heat energy for cooking is directed downwardly from an energy source against the top of a container for the materials to be cooked, and energy for vaporizing liquid within the container is directed upwardly from an energy source against the bottom of the container, characterized in that the container comprises a bottom and cover, said bottom and cover being imperforate, said bottom having a shallow central depression for receiving a liquid, said depression being defined by a flat bottom which forms a base on which the apparatus rests in stable equilibrium, and an upstanding circular wall rising therefrom, a substantially horizontal, annular seat surrounding the depression integral with the top of the upstanding circular wall and extending horizontally and outwardly therefrom substantially parallel to the flat bottom, thereby forming an annular reentrant shoulder at the bottom of the apparatus, said annular seat being of substantially less radial width than the flat bottom to provide additional stability to the base, and a vertical retaining lip at the outer edge of the horizontal seat, said cover being deep and having an outside diameter at the rim of such dimension as telescopically to engage within the lip, said cover being normally situated with the edge of its rim resting on the horizontal seat, said lip being of sufficient height so that the cover may rise off said seat an appreciable amount without complete disengagement of the cover and bottom by an abnormal pressure within the container, a perforate basket having a perforate bottom for food to be cooked situated within the container above said shallow recess and the liquid contained therein, said basket being of approximately the same diameter as the depression and legs fast to the bottom of the perforate support, said legs having lower ends for contact with the inside of the depressed portion of the bottom of the container and being long enough to support the basket with its perforate bottom at an elevation above said seat.

BUTLER AMES.

REFERENCES CITED

The following references are of record in the file of this patent:

UNITED STATES PATENTS

| Number | Name | Date |
|---|---|---|
| 80,881 | Smith, et al. | Aug. 11, 1868 |
| 174,224 | Garber | Feb. 29, 1876 |
| 306,633 | Moise | Oct. 14, 1884 |
| 388,500 | Parker | Aug. 28, 1888 |
| 776,926 | Misener | Dec. 6, 1904 |
| 831,746 | Rundell | Sept. 26, 1906 |
| 850,028 | Major | Apr. 9, 1907 |
| 926,028 | Smith | June 22, 1909 |
| 931,209 | Lincoln | Aug. 17, 1909 |
| 1,305,818 | McFarland | June 3, 1919 |
| 1,550,707 | Moore | Aug. 25, 1925 |
| 1,630,237 | Smith | May 24, 1927 |
| 1,673,164 | Silen | June 12, 1928 |
| 1,698,205 | Teller | Jan. 8, 1929 |
| 1,702,854 | Simonds | Feb. 19, 1929 |
| 2,093,013 | Jennings | Sept. 14, 1937 |
| 2,097,793 | Howell | Nov. 2, 1937 |
| 2,138,706 | Myers | Nov. 29, 1938 |
| 2,204,681 | Kircher | June 18, 1940 |
| 2,214,630 | Wheeler | Sept. 10, 1940 |
| 2,413,204 | Wolff | Dec. 24, 1946 |

FOREIGN PATENTS

| Number | Country | Date |
|---|---|---|
| 113,856 | Germany | Feb. 20, 1900 |
| 650,519 | France | Sept. 24, 1928 |
| 18,070 | Australia | June 20, 1934 |